United States Patent
Bugnet et al.

(10) Patent No.: US 6,551,661 B1
(45) Date of Patent: Apr. 22, 2003

(54) METHOD FOR CONDUCTIVE ACTIVATION OF THICK COMPLEX POROUS STRUCTURES

(75) Inventors: Bernard Bugnet, Le Plessis-Trevise (FR); Denis Doniat, Paris (FR)

(73) Assignee: S.C.P.S. Societe de Conseil et de Prospective Scientifique S.A., Rosny-sous-Bois (FR)

(*) Notice: Subject to any disclaimer, the term of this patent is extended or adjusted under 35 U.S.C. 154(b) by 37 days.

(21) Appl. No.: 09/664,891

(22) Filed: Sep. 19, 2000

Related U.S. Application Data

(63) Continuation of application No. PCT/IB99/00452, filed on Mar. 17, 1999.

(30) Foreign Application Priority Data

Mar. 19, 1998 (FR) .............................. 98 03375

(51) Int. Cl.$^7$ ................................. B05D 5/12
(52) U.S. Cl. ...................... 427/301; 427/341
(58) Field of Search ................ 427/301, 337, 427/340, 341

(56) References Cited

U.S. PATENT DOCUMENTS

| | | | | |
|---|---|---|---|---|
| 4,617,228 A | * | 10/1986 | Newman et al. | 428/265 |
| 4,636,430 A | * | 1/1987 | Moehwald | 428/304.4 |
| 4,680,236 A | * | 7/1987 | Myers et al. | 428/515 |
| 4,803,096 A | * | 2/1989 | Kuhn et al. | 427/121 |
| 5,523,119 A | | 6/1996 | Wettermark et al. | |
| 5,591,482 A | | 1/1997 | He | |
| 5,683,744 A | * | 11/1997 | Jolly et al. | 427/121 |
| 6,284,412 B1 | * | 9/2001 | Minakata et al. | 429/303 |
| 6,290,832 B1 | * | 9/2001 | Bugnet et al. | 205/161 |

FOREIGN PATENT DOCUMENTS

| | | | |
|---|---|---|---|
| EP | 0 761 710 | | 3/1997 |
| FR | 2706468 | * | 12/1994 |
| JP | 07-118427 | * | 5/1995 |

OTHER PUBLICATIONS

Aydinli et al, Journal of Applied Polymer Science, 72(14), pp 1843–1850, 1999.*

* cited by examiner

*Primary Examiner*—Erma Cameron
(74) *Attorney, Agent, or Firm*—Sturm & Fix LLP

(57) ABSTRACT

The invention concerns complex porous structures varying in thickness and the method used for making them electrically conductive by conductive polymer deposit. The conductive activation is obtained by depositing a conductive polymer, set on the whole developed surface of the structure through its entire thickness, by pre-treatment steps for oxidizing the structure, depositing a monomer, polymerizing oxidaton-doping of the monomer. The structures are of the type crosslinked foam, felt or woven fabric and are mass-treated by flowing treatment solutions within blocks, still unwound rolls. Said structures, which can be metal-coated or not, are particularly designed to be used as electrodes for the electrolysis of effluent liquids, detecting and trapping organic or biological molecules, supporting electrodes for electrochemical generators, catalyst supports, filtering media, sound insulating materials, electromagnetic, nuclear, antistatic protecting structures, heat exchangers and others.

17 Claims, No Drawings

METHOD FOR CONDUCTIVE ACTIVATION OF THICK COMPLEX POROUS STRUCTURES

CROSS-REFERENCE TO RELATED APPLICATIONS

The application is a continuation of PCT/IB99/00452, filed Mar. 17, 1999, now Patent No. WO 9948108.

STATEMENT REGARDING FEDERALLY SPONSORED RESEARCH OR DEVELOPMENT

Not Applicable.

BACKGROUND OF THE INVENTION

1. Field of the Invention

The invention relates generally to the area of manufacturing electrically conductive, complex, porous structures which are optionally metallised or metallic.

The invention relates more particularly to the area of manufacturing complex structures of high porosity which are optionally metallised or metallic for use as electrodes for the electrolysis of liquid effluents, to detect and trap organic or biological molecules, as support electrodes for storage cells, catalysis supports, filtering media, sound insulators, electromagnetic, nuclear and antistatic structures, heat exchangers, etc.

The metallic or metallised structures according to the invention are of the foam, nonwoven or woven type with a high degree of open porosity, giving the impression of a dense network of fibres or meshes with a three-dimensional skeleton, defining a large number of voids which are interconnected with each other and with the exterior of the structures.

The foam structures consist of a cross-linked honeycomb structure with a high porosity (greater than 80% and able to reach about 98%) and with a porosity which has been opened up by expansion, in which the mesh in the network is interconnected in its entirety or at least to a very large extent.

The nonwovens are random tangles of non-woven fibres (however, the bulk of them are located substantially in the plane of the "nap" which is formed), defining enclosed, interconnected, inter-fibre spaces with varying shapes and sizes. The fibres therein may be pasted over with a bonding agent, or not.

The woven fabrics are structures formed by assembling interlaced, woven or meshed textiles from threads or fibres. They can be provided in the form of thick and complex structures, in particular when they are two external woven faces linked by knitted loops of thread which keep them apart but also interconnected, such as are produced, for example, by Raschel type weaving looms.

These various complex porous structures which, according to the invention, may be intended to be metallised throughout their entire thickness, on all the available surface area, without clogging the pores, can be supplied in various basic materials.

The foams are organic, mineral or synthetic materials and in particular polymers such as polyamide, polyurethane (polyesters or polyethers) or polypropylene.

The nonwoven and woven materials are also organic, mineral or synthetic materials, such as those mentioned above, or glass, rock wool or carbon fibres, or natural fibres such as cotton, wool or the like.

2. Description of the Prior Art

A variety of methods for metallising such structures have been suggested, among which are:

chemical deposition of metal, followed by one or more electrochemical coatings, deposition of particles of carbon or graphite, in particular in the form of a conductive paint or lacquer, followed by one or more electrochemical coatings, metallic deposition under vacuum, in particular by cathodic evaporation, gaseous diffusion or ionic deposition, followed by one or more electrochemical coatings, deposition by thermal decomposition of a metallic compound in the vapour phase, chemical deposition of a conductive polymer, followed by one or more electrochemical coatings of metal.

In all cases where it is intended to proceed to one or more electrochemical coatings, it is best first to sensitise, that is to make electrically conductive, the surface which is to be metallised using an electrochemical route. This is the function of the "conductive activation" stage which appears in most of the procedures cited (chemical deposition of metal or of polymers, deposition of particles of carbon, deposition under vacuum).

According to the procedures also described above for producing one or more electrochemical coatings, the activation processes (and this is one of their major limitations) enable the complex porous structures which are subsequently to be metallised to be made conductive only in the form of sheets (or strips) of reduced thickness, which have to be transported and reeled through one or more treatment tanks (chemical baths, carbon lacquer baths, enclosures for deposition under vacuum).

Chemical deposition of metals and conductive polymers, and the deposition of particles of carbon or graphite have thus to be performed in sequence when working on an industrial scale, by unwinding the rolls of strips of foam, nonwoven or woven material, passing the material through a succession of treatment baths and then rewinding the material at the end of the activation line.

In a similar way, activation by deposition of metal under vacuum using the technique of cathodic evaporation is performed in the unrolled state, by passing in front of magnetrons, in a semi-continuous manner, between an input roll and an output roll.

Thus, the products which are activated are always present in a thin layer (sheets or strips). These thin layers are restricted to a thickness of the order of a millimeter or a few millimeters, depending on the porosity of the treated product, the dimensions of the pores or interstices and the power of penetration of the activation process.

Foams with the quality designated "100 ppl" (100 pores per linear inch), that is with about 40 pores per linear centimeter at the surface can be activated on an industrial scale and in a satisfactory manner only with thicknesses of about 5 millimeters when using chemical deposition and under vacuum, and with thicknesses of less than about 3 millimeters when using carbon or graphite powder deposition.

DETAILED DESCRIPTION OF THE INVENTION

The present invention, is directed in particular at the provision of a new conductive activation process, an innovative development of the continuous chemical deposition of a conductive polymer described in French patent application no. 95.09547 dated Aug. 4, 1995, enabling the employment of high performance conductive activation of complex porous structures which are no longer treated in the inevitable thin strips but in thicknesses which can reach several centimeters or tens of centimeters.

This process has many advantages over the techniques in the prior art, as will be demonstrated, and enables "blocks" of products to be treated.

According to French patent application no. 95.09547 dated Aug. 4, 1995, conductive activation is performed by the chemical deposition of a conductive polymer.

The layer of conductive polymer is obtained by the polymerisation of a monomer deposited (grafted) on the fibres or meshes of substrate to be treated. The monomer may be, in particular, pyrrole, furan, aniline, thiophen or certain of their derivatives, and in particular functionalised monomers.

According to French patent application no. 95.09547, the complex porous structures in a thin layer, prior to electrochemical metallisation of same, undergo a conductive activation treatment organised as follows:

1. oxidising pre-treatment of the basic structure,
2. washing, optionally followed by draining/drying,
3. deposition, at the surface of the fibres or meshes in the structure, of a monomer, a polymerised form of which is electrically conductive,
4. draining, washing and optional drying of the structure,
5. oxidation/doping for polymerisation of the monomer previously deposited,
6. washing and optionally draining,
7. optional drying of the structure.

Reference is made to the document 95.09547 for all explanations and verifications of the part played by each of the steps mentioned above.

In order to operate continuously, on an industrial scale, the structures are treated in a line system, the strip of foam, nonwoven or woven fabric from an input roll passing through a succession of tanks containing the treatment solutions for steps 1, 3 and 5, between and following which the operations in steps 2, 4, 6 and 7 are performed. The strip, conveyed mechanically through this sequence of treatments, is rolled back into a roll at the output end and is then ready to undergo the electrolytic deposition procedure(s) for metallisation. It is the product being treated which is moved from one bath to the next.

The present invention provides an original use of and a significant improvement in the conductive activation process using conductive polymer deposition described in document 95.09547.

The present invention has been refined in order to provide a satisfactory and novel response to the practical treatment problems posed by conductive activation of complex, porous structures on a reel-to-reel basis, to respond the growing need to produce these products, for a variety of applications, with a greater thickness and finally to provide a large reduction in the costs of industrial scale treatment.

According to the present invention, conductive activation is performed by chemical deposition of a conductive-polymer.

The process was chosen for the following main reasons:

high potential for penetration to the very middle of complex porous structures in thick layers during treatment (via the liquid route), provided suitable operating conditions are used;

excellent potential for a high degree of conductivity (and continuity of the conductive layer) of the product after activation treatment, provided suitable operating conditions are used;

high economic, safety and reproducibility potential for the process, provided suitable operating conditions are used;

high potential for stability of the activation treatment, during storage and during subsequent electrolysis procedures, provided suitable operating conditions are used.

Use of the reel-to-reel process described in document 95.09547 enables the production of sheets of complex porous structures such as three-dimensional foams, nonwovens and woven fabrics having, after activation, resistance values of a few hundreds or even a few tens of ohms per unit surface area. The products activated in thin layers in this way may, for example, receive an electrolytic coating of nickel in a Watts bath or in a bath of the sulfamate type under voltages of less than and/or with rates of deposition greater than those which it is possible to achieve, all other factors being equal, on products activated by the deposition of carbon or graphite or the deposition of nickel under vacuum (performed in accordance with French patent application 84.01110 dated Jan. 25, 1984). This is due to the high level of conductivity and also to the continuity and stability of the conductive coating.

However, like all conductive activation processes performed in a reel-to-reel process, treatment with conductive polymers may encounter mechanical problems when developed to full industrial scale. The difficulties are linked to the transport and unwinding of flexible, ductile structures, in thin, wide strips which are likely to undergo traction stresses which can deform them or even lead to ruptures. That is especially critical for structures of the foam type which are mostly made of polyurethane and have extremely fragile mechanical properties.

All industrial methods for conductive activation of foams or fibrous structures have hitherto been operated, for economic reasons, in a continuous or semi-continuous manner.

That applies to both chemical processes for metallic or polymer deposition and also to the deposition of carbon powder or graphite in the form of a lacquer or "paint" (all performed in a continuous process), and finally to physical deposition under vacuum achieved by cathodic evaporation (semi-continuous process).

Continuously operated plants for activation, whatever the process selected, are built in the form of a suitable sequence of treatment tanks and arrangements for washing and drying, through which the strip of structure to be treated has to pass, by being transported by motorised and/or non-motorised transporter rollers, being plunged into the solutions and/or pulled out of the solutions.

While passing round this relatively complex circuit, which it has to follow, the strip undergoes variable traction and compression stresses depending on the particular positions through which it is moved. A person skilled in the art will readily understand, for example, that these stresses are not the same in zones where the structure is dry and in those in which it is impregnated with one or other of the treatment solutions, when it is passed into the middle of a bath or when it is being reeled through the air, when it is vertical or horizontal, when it is at ambient temperature or at higher temperatures.

Many precautions have to be taken in order to attempt, as far as this is possible, to equalise these stresses, but deformation or rupture of the strip is frequently observed. Stretching, leading to narrowing of the width of the strip being treated, is noted in particular, and in the same way, in foams, pores with a virtually spherical shape become deformed and change to a longish shape. The thickness of the strip itself is thus affected by the treatment and loses some of its homogeneity.

These deformations in the width and thickness of the strip of product may require the additional corrective operations of cutting and calendering which then lead to additional costs and/or to losses of product.

Another mechanical problem linked to operating in a reel-to-reel mode, relates to guiding the strip. The strip has a natural tendency to deviate from the correct spooled path, with respect to the axis of spooling. Twisting of the strip is observed, with deformations and abnormal displacements leading to the appearance of various folds and creases, and here again ruptures, or to non-homogeneous activation of the strip.

Guidance aids for the strip are sought in particular via configurations which are not exactly cylindrical for the drive rollers and to a certain degree of play in the axes of these rollers. These adjustments are obviously a complicating factor for plants operating in reel-to-reel mode and also incur an increase in costs. They also introduce an element of weakness in the homogeneity, the reproducibility and the reliability of treatment. They require a costly surveillance system, whether it be human or automated.

The problems discussed above are obviously amplified both when the width of the strips treated increases and also when the speed of reeling increases, these being parameters which tend to increase along with progressive industrialisation. A transition from the pilot plant stage to the industrial stage, involves an increase from widths of 20 to 30 centimeters to widths of one to two meters and from speeds of reeling of a few meters per hour to several tens of meters per hour.

The present invention is mainly directed at making the use of a conductive activation process economically viable on an industrial scale, using a deposition of conductive polymers process which is not of the reel-to-reel type and enables the practical difficulties described above to be eliminated.

It is also aimed at making the use of a conductive activation process economically viable on an industrial scale, using a deposition of conductive polymers process which enables complex porous structures to be treated not only in thin layers but also, for the first time, in thick layers, which is of particular interest in the case of foam type structures.

It permits the treatment of rolls of foam, nonwoven or woven fabrics, without having to unroll them. Moreover, it enables the treatment of blocks of foam.

According to the invention, the treatment solutions are passed through the structure and the structure no longer has to be reeled successively through each bath or associated device (such as, for example, a washing sprinkler or a drying blower).

The conductive activation treatment thus operates, according to the present invention, by complete impregnation of the roll or block of porous structure to be treated with different solutions, injected into the main bulk of the porous structure, and is used in order to achieve:

oxidising pre-treatment, the deposition, or grafting, of a monomer, oxidation/doping for polymerisation of the monomer.

The intermediate steps of draining, washing, drying are also performed throughout the entire roll (without unwinding) or block.

The treatment of large volumes of complex structures with high porosity, without unrolling them in the form of thin strips, sheets or ribbons, has involved, in the context of the present invention, various adaptations of the process described in document 95.09547.

Thus, the first step, oxidising pre-treatment of the basic structure, which was advantageously performed, for a polyurethane foam onto which pyrrole is to be deposited, by means of an aqueous solution of $KMnO_4$ with a concentration of 20 g/liter at temperatures of about 70° C. in order to obtain short residence times (about 4 minutes), was rearranged in accordance with the invention in order to favour homogeneous treatment adapted to passage of the solution through the entire volume of the product. This objective is preferably achieved by a time of immersion of the product in the solution which can be of the order of 7 to 15 minutes (time to fill and drain the enclosed structure) and a bath temperature lowered to about 20 to 35° C., so that the required attack of the surface of the fibres or strands of material in the structure might be comparable, without degradation of said structure.

Regarding deposition of the monomer (grafting), in the case of pyrrole it is possible to retain the formulation and conditions for temperature and time of treatment described in document 95.09547. However, it has been shown that, in the context of the present invention, a different formulation could be adopted, for process economy reasons.

Document 95.09547 suggests avoiding the use of the traditional solvent for pyrrole, benzene, for safety reasons, and using a solution of the type:

80 cc/l of pyrrole 120 cc/l of isopropanol 800 cc/l of water

According to the present invention, it is advantageous, in order to economise on the use of isopropanol, to make up an alkaline deposition solution of the pyrrole/water/potash type with a pH greater than 10, in particular about 13.5, and using this at a temperature of preferably between 12 and 25° C.

This type of solution, which enables the dissolution of pyrrole, is aggressive towards most of the structures to be treated, in particular towards polyurethane foams. Its use, in the context of a reel-to-reel activation process acting on strips of foam, makes the structure very fragile and this temporarily loses its mechanical "strength" and is thus particularly prone to deformations and ruptures.

In contrast, it can be used when the structures being treated remain in the form of blocks or non-unrolled rolls.

According to the invention, the deposition of pyrrole step, in such a solution, can be performed in times of advantageously between 5 and 15 minutes. When applied to polyurethane foams, it may be noted that reaction times of more than 5 minutes contribute very little to the final result of activation.

The oxidation/doping step for polymerisation of the monomer can be performed under the conditions described in the document 95.09547 when applied, for example, to the polymerisation of pyrrole.

With regard to the intermediate steps of draining, washing and drying, it can be shown, in the context of the present invention, that they can take place directly throughout the rolls (without unrolling) or blocks of porous structures. They are performed in order to limit the loss and trapping of treatment solutions.

As a non-restrictive example of the invention, the complete performance, in accordance with a preferred mode of applying the invention, of a conductive activation treatment, by deposition of a conductive polymer, followed by electrochemical metallisation of a complex porous structure, is described below.

The structure that is to be activated is a polyurethane foam of the quality called "ppl 100", expanded, the density of which is about 30 kg/M³.

The pre-treatment step is performed by immersion of a block of foam, with the dimensions 100×50×50 centimeters, for 15 minutes in an aqueous solution of potassium permanganate ($KMnO_4$) with a concentration of 20 g/liter, at a pH of substantially 8. The temperature of the solution is between 25 and 35° C.

The use of this pre-treatment solution offers the advantage of leading to the formation, at the surface of the mesh in the foam, of a layer of manganese dioxide ($MnO_2$). When grafting of the monomer is performed at a later stage, the $MnO_2$ is transformed, at least partly, on contact to a lower state of oxidation, thus initiating oxidation, and therefore polymerisation, at the lower face of the monomer.

A washing step is then performed, after an initial draining period, by immersing the block of foam in a still bath of mains water, then by spraying the block, also with mains water.

The foam is again drained for a few moments and then dried, preferably in warm air.

The monomer grafting step is performed by immersion of the block of foam in a solution of pyrrole ($C_6H_5N$) in a potash/water mixture.

The composition used in the example is as follows:

50 cc/l of pyrrole 28 g/l of potash 950 cc/l of water.

This solution, with a 0.6N concentration of potassium hydroxide, has a pH of about 13.5.

The temperature of the solution used when performing the process in accordance with the example, is preferably between 15 and 20° C.

The time of immersion is 5 to 10 minutes.

The amount of pyrrole deposited during the course of this step is a few kilograms per cubic meter and, in the present example, 3 kg/m³.

The foam is then drained, a very important procedure at this stage in order to limit losses of solution and in particular of pyrrole, for a period of about one to two minutes. This draining procedure may advantageously be encouraged by shaking the block of foam and/or by blowing air through the block.

The pyrrole polymerisation step to give polypyrrole is performed by immersing the block of foam in an aqueous oxidant/dopant solution with the following composition:

50 g/l of ferric chloride, 50 cc/l of 34% fluoroboric acid.

The temperature of the solution is advantageously about 20° C. and the time of polymerisation treatment is 15 to 20 minutes.

This is followed by washing the block of foam by immersing it in a still bath of mains water, then a second washing process in a still bath of ion-exchanged water, before drying, which can be performed by blowing with warm air.

After conductive activation, measuring the resistance of the foam gives values between 10 and 50 ohms per unit surface area, both at the surface of the block and in any section taken from the interior.

It is then possible to proceed with cutting the block of foam in order to obtain the required shapes, which may be of any type: in particular sheets, strips or ribbons formed by 'peeling' the block, various prismatic or cylindrical shapes, sleeves, etc. adapted to the intended use.

It should be noted that the opportunity offered by the invention of proceeding to shape treated structures of the foam type only after conductive activation of same, and not before that time, as has been the case hitherto, offers various important advantages.

During the various activation stages, the treated structure is subject to the stresses mentioned above, in particular, during deposition of the monomer, a significant loss of mechanical strength.

When activation is performed, in accordance with the invention, on non-unrolled and thus compact rolls, or more often on blocks of porous structures, the effect of this loss of strength is largely compensated by the immobility of the product which remains in a dense, solid form instead of having to circulate as a thin ribbon.

The treated structures, in compact rolls or in blocks, however, undergo deformations which are limited by their volume. These deformations are generally most marked with polyurethane foams. Treatment in the form of blocks brings an especially interesting response, from this point of view, to the problem of deformations.

In fact, not only does the strength of the foam remain greater in a block than is possible in a sheet or a thin slice, which can easily be understood for a honeycomb-like structure, but the deformations which are still observed become less important in the finished product.

If the foam is cut into thin strips for example strips 1 to 3 mm thick for application to electrode supports for storage cells), and this takes place before activation, the deformations and irregularities induced in the width and the thickness are still present to a measurable extent in the activated product and then in the final product, that is to say after metallisation.

When conductive activation is performed on a block of foam, and this is cut to produce a roll of 1 to 3 mm thick strip only after the structure has been made conductive, this cutting procedure after activation enables a strip with a perfectly regular thickness and width to be produced. These deformation effects can thus be "erased".

Moreover, and this applies to structures which are treated in rolls or in blocks, the invention enables a significant improvement in the homogeneity of the final product which is particularly sought after for a number of applications when activation is to be followed by electrolytic metallisation.

Activation according to the invention enables the avoidance or limitation of well-known problems of electroplating, these being linked to the phenomenon of "buttoning" or the "point effect" in the metallic deposit on the surface of the structure being coated.

In fact, a person skilled in the art knows that during the electrolysis of a surface which is not smooth and flat and which is used as the cathode in a electroplating bath, metallic deposition takes place preferentially on areas of the treated surface which are closest to the anode(s). In the case of very complex structures, such as foams, this electrochemical characteristic leads to "buttoning" of the metallic deposit at points in the mesh which project from the surface. These projecting points act as what the skilled person calls "current consumers". They concentrate the deposits to the detriment of areas in the structure which are located further away from the anodes, that is to say, in the case of a structure which is located between two anodes, to the detriment of the central sections of the structure. Thus there is always a thickness differential between the metallic deposits produced at the extreme parts and the internal parts of a complex three-dimensional structure metallised by electroplating. This means, on the other hand, that electrolysis has to be performed under conditions which minimise this phenomenon in order for the ratio of the thicknesses of deposit obtained in the interior to that on the surface to be as close as possible to 1. This ratio, for metallic or metallised foams, is routinely called the D.T.R. (Differential Thickness Ratio) by manufacturers and users.

In order to obtain low values for this ratio it is therefore appropriate and expedient that the structure, before electrolysis, has a lower conductivity at the points of the mesh which project from the surface than at any other point. This enables the phenomenon and the formation of "current consumers" to be limited.

The present invention, by using treatment directly through rolls of foam, nonwoven or woven fabric, or through blocks of foam, provides an appropriate and economic solution to this problem.

When activation is performed on a reel, obtained by rolling up on itself a strip (foam, nonwoven or woven fabric), the parts of the threads, fibres or mesh which project from the surface are flattened against corresponding threads, fibres or mesh which project from the surface of sections in adjacent strips. These are the points which, when activated, could constitute the bulk of the current consumers in the electrolysis phase. Now, the fact that these points are flattened against each other protects them from at least some of the deposit of monomer and from the oxidation/doping of that monomer to give a conductive polymer. This advantageous situation becomes clear when, after activation, the strip making up the treated roll is unrolled. A slight degree of adherence is observed between the turns of strip, an adherence which pulls apart without breaking up the strip, but which demonstrates that the conductive deposit links together the zones of contact of any flattened fibres or mesh with those in any superimposed turns. The rupture of these contact points often strips bare the points which will constitute projecting points on the surface of the unrolled strip, that is to say they then have not been activated or have a reduced conductivity.

If that activation is performed throughout a block of foam, the result in the matter of eliminating current consuming points is even more obvious.

In fact, it is only after activation of the block throughout its entire volume that the block is "peeled" in order to obtain a strip of the chosen thickness (or cut into any other shape). The cutting process in the peeling operation strips bare the slices of mesh which are flush with the surface of the sliced structure and provide a face of polyurethane (or some other material constituting the original substrate) which is not coated at all with conductive polymer.

Comparative electrolytic metallisation tests have been performed under identical electrolysis conditions, using sheets of foam activated with pyrrole, some activated directly in the form of sheets of the thickness required for electrolysis, others activated in blocks and then cut into sheets after activation.

These tests were performed:
on two types of polyurethane foam with ppl 100 and ppl 80 (40 and 30 pores per linear centimeter, respectively),
on sheets of two different thicknesses, i.e. 1.7 mm and 5.0 mm,
and finally, by electrolysis of copper and nickel.

In all cases, it was apparent that the effects of buttoning, very marked at points of mesh projecting from the surface of sheets activated in this shape, were greatly reduced, or even eliminated, on sheets cut up after the activation of blocks of foam.

The localised non-accumulation of metallic deposits on these points of the surface (buttoning) enabled the electrolytic deposition process to be performed throughout the structure more homogeneously, and consequently to produce a ratio of the thickness of metallic deposit in the interior to that at the surface which was close to 1.

It was observed during the course of the electrolysis tests that, for deposits of copper or nickel of several tens of grams per square meter of the apparent surface of the sheet of foam, slices of non-activated mesh were, however, gradually coated with metal, the deposit reaching these surfaces by a proximity effect. Thus the mesh could be entirely coated with metal.

In a manner which does not restrict the invention, the complex porous structures according to the invention can be metallised by the deposition of copper, nickel, iron, chromium, zinc, aluminium, lead, tin, gold, platinum or any other noble metal, or by deposits of alloys, mixtures or the superposition of at least any two of these metals.

The metallised complex porous structures according to the invention may be subjected or not, after metallisation, to thermal treatment aimed at burning away the organic material originally present and added during activation, and to thermal treatment of the metallic deposits(s) under a controlled atmosphere.

The activated structures according to the invention may be used as such, without being subjected to subsequent metallisation. These structures which have been made conductive by the deposition of a conductive polymer can be used in particular in many applications in the areas of electromagnetic protection, antistatic protection, thermal exchange or the detection and trapping or organic or biological molecules, etc.

These uses are favoured by the possibility according to the invention of preparing these structures in a variety of shapes. The invention also favours these uses through the quality of the conductive deposit produced, and in particular by its stability in dry or wet, neutral or acid, media.

Naturally, and largely as a result of what has been described hereinabove, the invention is not restricted to the particular embodiments which are described by way of example.

The invention is not restricted to the examples which have been provided, but covers all variants thereof.

What is claimed is:

1. A process for the chemical deposition of a conductive polymer on porous structures of cross-linked foam, enabling said structures to be rendered electrically conductive, performed in the interior of said structures, within the entire thickness of the structures, at the surface of each fiber or mesh, without clogging the pores, rendering them continuously electrically conductive over the entire available surface area, which enables the treatment of structures presented in the form of blocks or rolls, in the latter case without unrolling, by impregnation throughout their entire volume with treatment solutions, and in that it includes the following steps:

a) oxidizing pre-treatment of the basic structure using a solution of potassium permanganate at a temperature between 20° and 35° C., b) washing, optionally followed by draining and drying, c) depositing a monomer selected from pyrrole, furan, aniline, thiophen or derivatives thereof, d) draining, e) polymerizing the monomer, by oxidation/doping, to form an electrically conductive polymer, f) washing and draining;

wherein these various steps being performed one after the other throughout the volume of the structure to be treated.

2. The process according to claim 1, wherein the deposited monomer is pyrrole and the corresponding conductive polymer, formed by oxidation of the pyrrole, is polypyrrole.

3. The process according to claim 1, wherein the pyrrole is in solution in water to which potash has been added, said solution having a pH greater than 10.

4. The process according to claim 1, wherein when treating a block of cross-linked foam, the block is cut into shapes, optionally into sheets or strips, after treatment, avoiding the point effect during subsequent metallic deposit on the surface of the shapes.

5. The process according to claim 1, wherein said process renders the treated structures continuously electrically conductive, enabling electrolytic metallisation, over all the available surface area.

6. The process according to claim 1, wherein pulling apart turns of a roll formed of a strip reveals, at the surface of the strip, portions which are not coated with conductive polymer and/or are coated to a lesser extent than portions which are not flush with the surfaces of the strip, which limit point effects during later electrolytic metallisation, and thus achieves a distribution of the metallic deposit in the interior of the structure, from the surfaces to the core of the structure.

7. The process according to claim 1, wherein cutting blocks of treated foam into strips reveals, at the surface of the strip, sections of meshes which are not coated with conductive polymer, which limits the point effects during electrolytic metallisation, and thus achieves a distribution of the metallic deposit in the interior of the structure, from the surfaces to the core of the structure.

8. The process according to claim 1, further including the step of:

g) drying, said drying step following said step of washing and draining.

9. The process according to claim 1, wherein said structures are metallized by depositing copper, nickel, iron, chromium, zinc, aluminum, lead, tin, gold, platinum or any other noble metal, or by depositing alloys, mixtures or the superposition of at least any two of these metals.

10. The process according to claim 2, wherein the pyrrole is in solution in water to which potash has been added, said solution having a pH greater than 10.

11. The process according to claim 5, wherein pulling apart turns of a roll formed of a strip reveals, at the surface of the strip, portions which are not coated with conductive polymer and/or are coated to a lesser extent than the portions which are not flush with the surfaces of the strip, which limit point effects during later electrolytic metallisation, and thus achieves a distribution of the metallic deposit in the interior of the structure, from the surfaces to the core of the structure.

12. The complex porous structure according to claim 2, wherein said treatment includes the step:

drying, said drying following the step of washing and draining.

13. A process for the chemical deposition of a conductive polymer on porous structures of cross-linked foam, enabling said structures to be rendered electrically conductive, performed in the interior of said structures, within the entire thickness of the structures, at the surface of each fiber or mesh, without clogging the pores, rendering them continuously electrically conductive over the entire available surface area, which enables the treatment of structures presented in the form of blocks or rolls, in the latter case without unrolling, by impregnation throughout their entire volume with treatment solutions, and in that it includes the following steps:

a) oxidizing pre-treatment of the basic structure, b) washing, optionally followed by draining and drying, c) depositing a monomer, d) draining, e) polymerizing the monomer, by oxidation/doping, to form an electrically conductive polymer, f) washing and draining;

wherein these various steps being performed one after the other throughout the volume of the structure to be treated, and wherein the monomer is pyrrole in solution in water to which potash has been added, said solution having a pH greater than 10.

14. A process for the chemical deposition of a conductive polymer on porous structures of cross-linked foam, non-woven or woven fabric type, enabling said structures to be rendered electrically conductive, performed in the interior of said structures, within the entire thickness of the structures, at the surface of each fiber or mesh, without clogging the pores, rendering them continuously electrically conductive over the entire available surface area, which enables the treatment of structures presented in the form of blocks or rolls, in the latter case without unrolling, by impregnation throughout their entire volume with treatment solutions, and in that it includes the following steps:

a) oxidizing pre-treatment of the basic structure at a temperature between 20° and 35° C., b) washing, optionally followed by draining and drying, c) depositing a monomer selected from pyrrole, furan, aniline, thiophen or derivatives thereof, d) draining, e) polymerizing the monomer, by oxidation/doping, to form an electrically conductive polymer, f) washing and draining, wherein these various steps being performed one after the other throughout the volume of the structure to be treated, and wherein pulling apart turns of a roll formed of a strip reveals, at the surface of the strip, portions which are not coated with conductive polymer and/or are coated to a lesser extent than portions which are not flush with the surfaces of that strip, which limit the point effects during electrolytic metallization, and thus achieves a distribution of the metallic deposit in the interior of the structure, from the surfaces to the core of the structure.

15. A process for the chemical deposition of a conductive polymer on porous structures of cross-linked foam, non-woven or woven fabric type, enabling said structures to be rendered electrically conductive, performed in the interior of said structures, within the entire thickness of the structures, at the surface of each fiber or mesh, without clogging the pores, rendering them continuously electrically conductive over the entire available surface area, which enables the treatment of structures presented in the form of blocks or rolls, in the latter case without unrolling, by impregnation throughout their entire volume with treatment solutions, and in that it includes the following steps:

a) oxidizing pre-treatment of the basic structure at a temperature between 20° and 35° C., b) washing, optionally followed by draining and drying, c) depositing a monomer selected from pyrrole, furan, aniline, thiophen or derivatives thereof, d) draining, e) polymerizing the monomer, by oxidation/doping, to form an electrically conductive polymer, f) washing and draining, wherein these various steps being performed one after the other throughout the volume of the structure to be treated, and wherein cutting blocks of treated foam into strips reveals, at the surface of the strip, sections of meshes which are not coated with conductive polymer, which limits the point effects during electrolytic metallization, and thus achieves a distribution of the metallic deposit in the interior of the structure, from the surfaces to the core of the structure.

16. A process for the chemical deposition of a conductive polymer on porous structures of cross-linked foam, non-woven or woven fabric type, enabling said structures to be rendered electrically conductive, performed in the interior of said structures, within the entire thickness of the structures, at the surface of each fiber or mesh, without clogging the pores, rendering them continuously electrically conductive over the entire available surface area, which enables the treatment of structures presented in the form of blocks or rolls, in the latter case without unrolling, by impregnation throughout their entire volume with treatment solutions, and in that it includes the following steps:

a) oxidizing pre-treatment of the basic structure, b) washing, optionally followed by draining and drying, c) depositing a monomer, d) draining, e) polymerizing the monomer, by oxidation/doping, to form an electrically conductive polymer, f) washing and draining, wherein these various steps being performed one after the other throughout the volume of the structure to be treated, and wherein the deposited monomer is pyrrole and the corresponding conductive polymer, formed by oxidation of the pyrrole, is polypyrrole, wherein the pyrrole is in solution in water to which potash has been added, said solution having a pH of greater than 10.

17. A process for the chemical deposition of a conductive polymer on porous structures of cross-linked foam, non-woven or woven fabric type, enabling said structures to be rendered electrically conductive, performed in the interior of said structures, within the entire thickness of the structures, at the surface of each fiber or mesh, without clogging the pores, rendering them continuously electrically conductive over the entire available surface area, which enables the treatment of structures presented in the form of blocks or rolls, in the latter case without unrolling, by impregnation throughout their entire volume with treatment solutions, and in that it includes the following steps:

a) oxidizing pre-treatment of the basic structure at a temperature between 20° and 35° C., b) washing, optionally followed by draining and drying, c) depositing a monomer selected from pyrrole, furan, aniline, thiophen or derivatives thereof, d) draining, e) polymerizing the monomer, by oxidation/doping, to form an electrically conductive polymer, f) washing and draining, wherein these various steps being performed one after the other throughout the volume of the structure to be treated, wherein said process renders the treated structures continuously electrically conductive, enabling electrolytic metallization, over all the available surface area; and wherein pulling apart turns of a roll formed of a strip reveals, at the surface of the strip, portions which are not coated with conductive polymer and/or are coated to a lesser extent than the portions which are not flush with the surfaces of the strip, which limit the point effects during later electrolytic metallization, and thus achieves a distribution of the metallic deposit in the interior of the structure, from the surfaces to the core of the structure.

* * * * *